United States Patent [19]

Gruen, Jr.

[11] Patent Number: 5,774,997
[45] Date of Patent: Jul. 7, 1998

[54] GOLF BALL OUT-OF-ROUND INDICATOR

[75] Inventor: Paul J. Gruen, Jr., Amesbury, Mass.

[73] Assignee: Performance Dynamics LLC, Middleton, Mass.

[21] Appl. No.: 778,279

[22] Filed: Jan. 2, 1997

[51] Int. Cl.$^6$ ................................................. G01B 5/22
[52] U.S. Cl. ........................... 33/508; 33/522; 33/550; 33/555.1; 206/315.9
[58] Field of Search .......................... 33/508, 522, 549, 33/550, 555.1, 555.2, 555.4; 206/315.1, 315.9; 473/131

[56] References Cited

U.S. PATENT DOCUMENTS

| | | | |
|---|---|---|---|
| 2,785,474 | 3/1957 | Mages et al. | 33/550 |
| 3,310,879 | 3/1967 | Brzezinski et al. | 33/555.2 |
| 3,371,419 | 3/1968 | Banks et al. | 33/522 |
| 3,797,123 | 3/1974 | Fraley | 33/508 |
| 4,385,447 | 5/1983 | Bennett | 33/508 |
| 4,528,759 | 7/1985 | Joyce et al. | 33/508 |
| 4,596,076 | 6/1986 | Sigg | 33/555.1 |
| 5,640,778 | 6/1997 | Shiue et al. | 33/550 |

*Primary Examiner*—Christopher W. Fulton
*Attorney, Agent, or Firm*—Robert K. Tendler

[57] ABSTRACT

An out-of-round indicator for golf balls utilizes an indicator module inserted into a golf ball sleeve or carton, with the module including a cup at its base into which the golf ball is dropped. The indicator includes a cantilevered arm extending from the base and spring loaded towards the surface of the golf ball, such that a surface of the arm contacts the surface of the golf ball, with the distal portion of the arm having a laterally extending tab or flag with differently colored spaced vertical markings. In one embodiment, a stationary vertically-extending support rises from a side of the base and has a vertical slot at its distal end overlying the tab, such that when the golf ball is rotated in the cup, the marking which appears through the slot indicates the out-of-roundness of the ball as the ball is rotated. The golf ball sleeve or box is provided with an aperture to permit rotation of the golf ball in the cup when the module is in the sleeve and when the golf ball is dropped into the cup. The sleeve is also provided with a transparent portion which overlies the slot in the support so that the out-of-roundness condition of the golf ball can be visually ascertained from outside the sleeve.

12 Claims, 2 Drawing Sheets

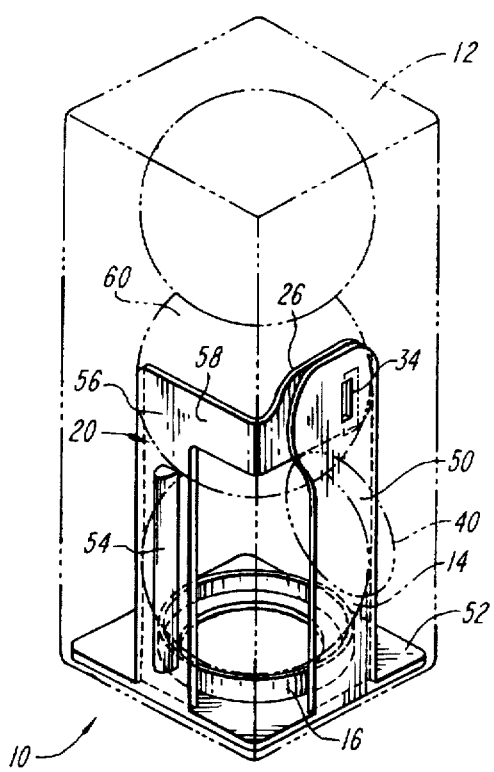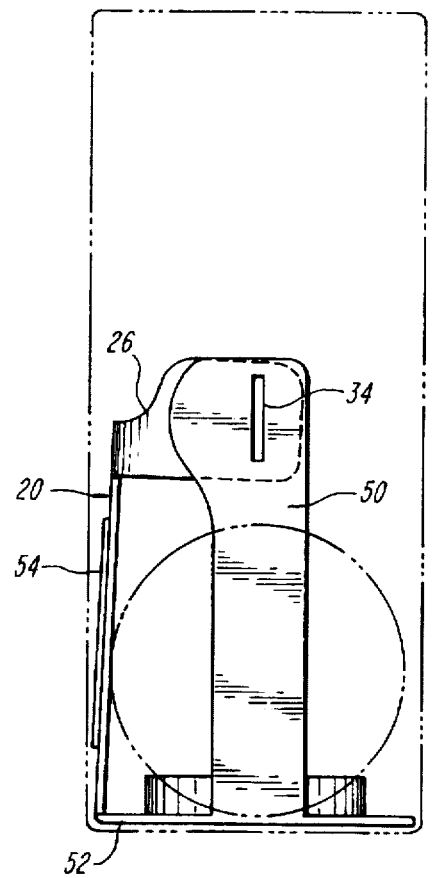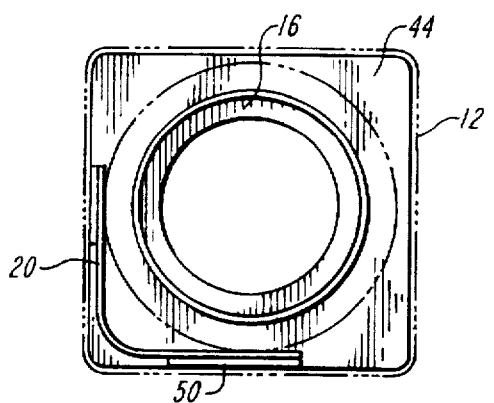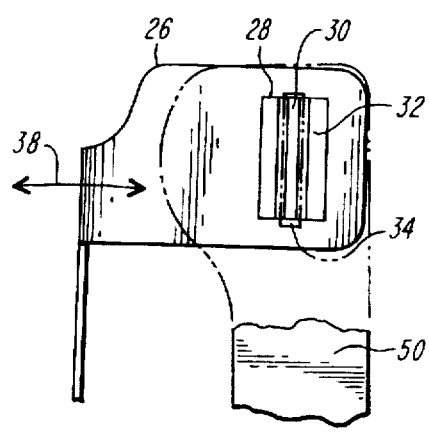

GOLF BALL OUT-OF-ROUND INDICATOR

FIELD OF INVENTION

This invention relates to golf ball out-of-roundness and more particularly to a system for measuring the sphericity of golf balls.

BACKGROUND OF THE INVENTION

As is well known, golf balls loose their perfect spherical shape during use due to the impact of the club with the ball. This loss of roundness is particularly apparent in three piece Balata golf balls which, because of their construction, are engineered for maximum accuracy or spin control. However, the three piece construction of the Balata golf balls provides a ball which is not as robust as other types of golf balls. This in turn results in the original spherical shape of the golf ball becoming lost during usage.

The performance of a golf ball is uniquely tied to its perfect spherical shape, and control of the golf ball depends on it. A nonspherical golf ball can hook or slice, or in general not travel the desired direction due to the deformity of the ball itself. It can thus be seen that the roundness of the golf ball affects the golf performance and is exceedingly difficult to visually detect.

Today's golfers are continually seeking game improvement through technology which can provide both physical and psychology advantages to his or her game. The out-of-round golf ball is an example of imperfect golf equipment which can impair a golfer's accuracy and may not be compensated for by his or her skill level. It is generally known that when an out-of-round golf ball is hit, the trajectory of the golf ball will be materially different from that of a spherical golf ball hit in the same manner. Also, since out-of-round balls also roll imperfectly, such a golf ball cannot be putted accurately even by the most skilled golfer. As a consequence, the imperfect shape of the golf ball can cause an adverse effect on one's score. Thus, golfers have in the past required a sphericity gage in order to help to determine which of his or her balls have become antiquated so that he/she may relegate them to the shag-bag or some other minor use.

By way of further background, current golfing technology has emphasized club head speed and ball distance. Harder club medals and faster club head speeds have reduced the golf ball's tolerance for mishits and have increased the likelihood of out-of-roundness. Additionally, softer ball covers begin to show signs of loosing their roundness after a few holes. Today, aerodynamic dimple design and ball sizing have produced distance advantages while polymer chemistry has provided for harder, less sensitive ball covering at the expense of "feel" and spin to those desiring the Balata experience.

As can be seen from U.S. Pat. Nos. 5,401,019; 4,385,447; 3,828,442; 3,512,262; 4,528,759; and 3,310,879 in the past attempts have been made to ascertain golf ball out-of-roundness by passing the golf ball through an aperture to see if the golf ball binds up or not. Moreover, a diameter gauge has utilized an eddy current probe such as shown in U.S. Pat. No. 4,425,545 to ascertain roundness, whereas contacting gauges for roundness testing are described in U.S. Pat. Nos. 5,383,283; 4,928,392; and 2,785,474.

While the above devices are capable of measuring the out-of-roundness of golf balls, the aperture type devices do not give a visual indication of out-of-roundness, but rather rely on binding up. Of course, eddy current devices are impractical on the golf course, and measuring gauges with feeler pins are likewise not practical in the golf environment.

SUMMARY OF THE INVENTION

In order to provide a practical out-of-roundness indicator, a module is utilized which is incorporated into the golf ball packaging. In one embodiment, the module is provided with a ball cup and a spring loaded arm which rests on the surface of the golf ball when the golf ball is inserted in the carton and dropped in the cup at the bottom of the carton. When the golf ball is rotated in the cup, the spring-loaded arm moves to detect the surface of the ball. In order to detect arm movement, the arm is provided with an indicator flag, with the flag having markings that, in one embodiment, are differently-colored, vertically-running bars. These marks move with the arm to indicate an out-of-round condition of the golf ball when viewed through a slot in a stationary support that extends from the base of the cup, such that as the ball is rotated, various colored stripes are visible through the slot to indicate by the color of the bar visible through the slot the roundness of the golf ball.

In one embodiment, the carton has an aperture adjacent the surface of the golf ball to permit rotation of the golf ball by manipulation from outside of the sleeve or carton when the golf ball is carried in the cup. The carton is also provided with a transparent portion which overlies the slot in the stationary support so that the out-of-round measurement may be viewed exteriorly of the carton.

In operation, a golfer merely drops the golf ball into the top of the carton, with the golf ball descending to the cup. Thereafter, by merely manipulating the golf ball so as to rotate it from the exterior of the carton, the indicator being visible through the carton indicates through which of the stripes is visible, the condition of the golf ball as it is rotated.

What is therefore provided is an exceedingly simple indicator device insertable into a golf ball sleeve or carton which permits the golfer to ascertain the sphericity of golf balls while at the same time providing a golf ball sleeve or container for the golf balls themselves.

In summary, an out-of-round indicator for golf balls utilizes an indicator module inserted into a golf ball sleeve, or carton with the module including a cup at its base into which the golf ball is dropped. The indicator includes a cantilevered arm extending from the base which is spring loaded towards the surface of the golf ball, such that a surface of the arm contacts the surface of the golf ball. The distal portion of the arm has a laterally extending tab or flag with differently colored spaced vertical markings. In one embodiment, a vertically extending support rises from a side of the base and has a vertically positioned slot at its distal end overlying the tab such that when the golf ball is rotated in the cup, the marking which appears through the slot indicates the out-of-roundness of the ball as the ball is rotated. The golf ball sleeve or box is provided with an aperture to permit rotation of the golf ball in the cup when the module is in the sleeve and when the golf ball is dropped into the cup. The sleeve is also provided with a transparent portion which overlies the slot in the support so that the out-of-roundness condition of the golf ball can be visually ascertained outside of the sleeve.

BRIEF DESCRIPTION OF THE DRAWINGS

These and other features of the subject invention will be better understood in conjunction with the Detailed Description taken in conjunction with the drawings of which:

FIG. 2 is an isometric view of the indicator module for insertion into the carton of FIG. 1;

FIG. 3 is a side view of the module of FIG. 2 indicating the movement of the cantilevered arm in response to rotation of the ball to indicate out-of-roundness of the ball;

FIG. 4 is an exploded view of the upper portion of the module of FIG. 3 showing the indication of out-of-roundness in terms of the cooperation of markings on the flag carried by the cantilevered arm as the appear through an aperture in a stationary support carried by the cup; and, FIG. 5 is a top view of the module inserted into a carton, showing the cup and the surrounding module indicator.

DETAILED DESCRIPTION

Figure 1:
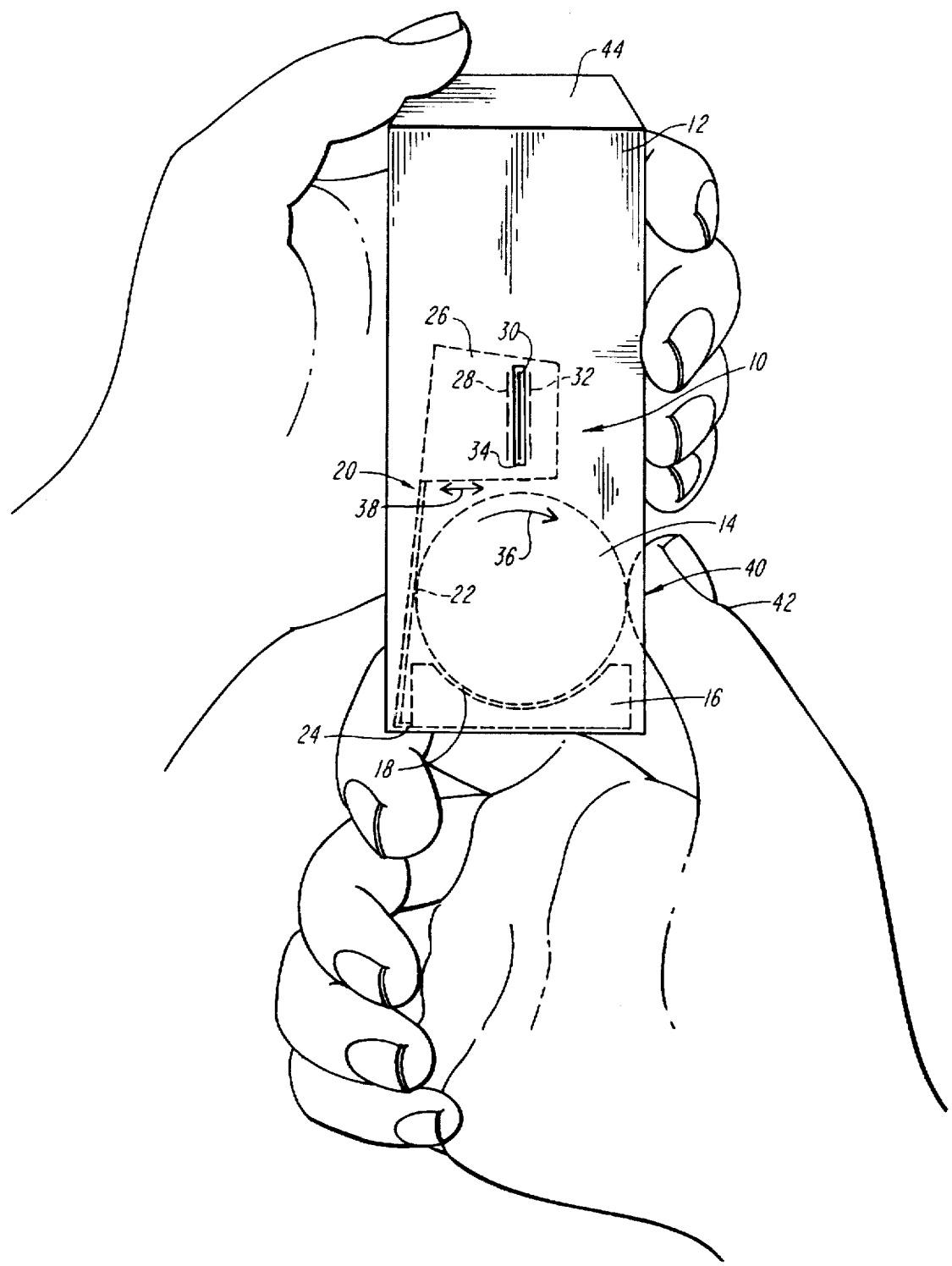
FIG. 1 is a diagrammatic representation of the subject invention showing a carton with an indicator module disposed therein, also indicating the rotation of a golf ball in a cup at the base of the module and the resulting out-of-roundness indication.

Referring now to FIG. 1, an indicator module 10 is positioned in a carton or sleeve 12 which adapted to house a number of golf balls 14, one of which is shown.

Indicator module 10 includes a cup 16 attached to a base which is adapted to receive golf ball 14, with the cup having a spherical inner surface 18 in which golf ball 14 is adapted to rotate. Indicator 10 has a spring-loaded cantilevered arm 20 which is adapted to contact the surface of the golf ball as shown at 22, with arm 20 being cantilevered from cup 18 at its base at point 24, such that arm 20 is spring loaded to the right to contact golf ball 14. Arm 20 carries a flag or tab portion 26 at its top or distal end, with the flag extending to the right as illustrated. On the flag are a number of vertically running markings 28, 30, and 32 which may be of different colors to indicate the out-of-roundness of golf ball 14. In one embodiment, bar 30 is green and bars 28 and 32 to either side are red.

As will be seen in connection with FIGS. 2, 3, and 4 described hereinafter, a slot 34 is provided in a stationary support (not shown in this figure) such that as the ball is rotated as indicated by arrow 36, one of the markings 28, 30 or 32 is visible through slot 34. Note that the vertically running markings are in the form of bars on flag 26. It will be appreciated that the bar which exists in aperture or slot 34 indicates whether the ball is true or whether the ball is out-of-round, since the flag 26 moves in accordance with the contact of arm 20 at point 22 with ball 14. This movement is shown by double-ended arrow 38.

It will be appreciated that carton 12 is provided with an aperture 40 such that an individual's thumb or finger 42 can be utilized to contact ball 14 and rotate the ball within the carton or sleeve. Likewise, it will be appreciated that carton 12 is transparent or has a transparent window over slot 34 so that markings 28, 30, and 32 can be viewed through slot 34 from the exterior of the carton.

In operation, an individual merely drops the ball in through the top 44 of carton 12 so that the ball descends into cup 16. Thereafter, the individual rotates the ball with his thumb through aperture 40 and watches the indicator bars through slot 34 to ascertain if the ball is out-of-round or not. If, for instance, green bar 30 is visible through slot 34, this means that the ball is within tolerance; whereas red bars 28 and 32 indicate that the ball is out-of-round. The subject indicator module thus provides an easy method of ascertaining golf ball out-of-roundness through placing of this module in a carton and manipulating the ball in the carton such that flag 26 moves, with the appropriate markings indicating the out-of-roundess condition of the ball. In an alternative embodiment, the module may be used by itself to ascertain golf ball sphericity.

Referring now to FIG. 2, module 10 includes a support 50 which is mounted to cup 16 by making it integral to base 52. It will be noted that support 50 carries aperture 34 such that the markings on flag 26 are visible therethrough.

Arm 20 extends upwardly from base 52 and in one embodiment is integrally formed therewith, with arm 20 optionally carrying a stiffener bar 54 that improves the accuracy of the measurement. It will be noted that arm 20 when formed integrally with base 52 has a spring moment which provides that arm 20 is spring loaded into the area where ball 14 is to reside.

It will also be appreciated that flag 26 is off-set from a central arm portion 56 which permits flag 26 to be off-set around a golf ball 60 in carton 12. In this manner, measurements can be taken with the carton fully loaded with golf balls.

Referring now to FIG. 3, arm 20 is shown cantilevered on base 52 with stiffener bar 54 in place at the back of the arm. Here it is clear that support 50 with its slot 34 overlies flag 26.

Referring now to FIG. 4, flag 26, when moving in the direction of arrow 38 causes one of three markings 28, 30, or 32 to be visible through slot 34 in support 50. This type of cantilevered arm measuring system provides an exceedingly accurate and inexpensive measurement of ball sphericity when, for instance, a ball is dropped down through the top 44 of carton 12 such that it descends into cup 16, with the indicator arm 20 and support 50 being pushed out of the way by the thrusting of the ball downwardly into cup 16.

Referring now to FIG. 5, a top view shows the top of cup 16 centered in carton 12 having been inserted through the top 44 of the container. Here arm 20 and support 50 are positioned to permit ball insertion.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

I claim:

1. Apparatus for measuring the out-of-roundness of golf balls, comprising:

a container adapted to house at least one golf ball, said container having an aperture at a side wall adjacent the base thereof to permit manipulation of a golf ball in said container adjacent said aperture; and, an indicator module adapted to be inserted into said container, said module having a centerline and including a base, a cup mounted to said base and adapted to receive a golf ball therein, a cantilevered arm extending upwardly from said base and being spring-loaded towards the centerline of said module, said arm having a surface adapted to contact the surface of a golf ball in said cup, said arm having a tab portion extending at an angle to said arm, said tab portion having at least one marking thereon, with said markings being indicative of the position of said arm relative to said base, and a stationary support extending upwardly from said base, a portion of said support overlying said tab portion and having an aperture therethrough of a size and position such that said marking is visible through said aperture when said arm is in a position indicative of a perfectly sized golf ball, whereby rotation of a golf ball in said cup results in a marking being visible in said aperture when the surface of said golf ball touching said arm is within a predetermined limit from an ideal golf ball surface.

2. The apparatus of claim 1 wherein said marking is in the form of a bar and wherein the size of said aperture corresponds in dimensions to the dimensions of said bar.

3. The apparatus of claim 2 and further including additional markings in the form of bars to either side of said first-mentioned bar and distinguished therefrom by color, whereby the color of the bar visible in said slot determines the degree of roundness of said golf ball as said ball is rotated in said cup.

4. The apparatus of claim 1 wherein said arm includes a vertically running stiffening member.

5. The apparatus of claim 1 wherein said base, arm, and support are integral one to the other.

6. The apparatus of claim 1 wherein said carton includes a transparent portion adjacent said aperture so that said marking can be viewed exteriorly of said case.

7. Apparatus for measuring the out-of-roundness of golf balls, comprising:

an indicator module having a centerline and including a base, a cup mounted to said base and adapted to receive a golf ball therein, a cantilevered arm extending upwardly from said base and being spring-loaded towards the centerline of said module, said arm having a surface adapted to contact the surface of a golf ball in said cup, said arm having a tab portion extending at an angle to said arm, said tab portion having at least one marking thereon, with said markings being indicative of the position of said arm relative to said base, and a stationary support extending upwardly from said base, a portion of said support overlying said tab portion and having an aperture therethrough of a size and position such that said marking is visible through said aperture when said arm is in a position indicative of a perfectly sized golf ball, whereby rotation of a golf ball in said cup results in a marking being visible in said aperture when the surface of said golf ball touching said arm is within a predetermined limit from an ideal golf ball surface.

8. The apparatus of claim 7 wherein said marking is in the form of a bar and wherein the size of said aperture corresponds in dimensions to the dimensions of said bar.

9. The apparatus of claim 8 and further including additional markings in the form of bars to either side of said first-mentioned bar and distinguished therefrom by color, whereby the color of the bar visible in said slot determines the degree of roundness of said golf ball as said ball is rotated in said cup.

10. The apparatus of claim 7 wherein said arm includes a vertically running stiffening member.

11. The apparatus of claim 7 wherein said base, arm, and support are integral one to the other.

12. Apparatus for measuring the out-of-roundness of a golf ball in a golf ball-containing carton, comprising;

a measurement module adapted to be inserted into said carton, said measurement module having an indicator there at for measuring the sphericity of a golf ball, including means for sensing the golf ball out-of-roundness and means for visually indicating the out-of-roundness of the golf ball, said golf ball-containing carton having sides and a transparent window in one of said sides positioned such that said indicator can be viewed exteriorly of said carton.

* * * * *